3,064,042
PROCESS FOR PREPARING 2-NITRO-4-CARBOXY-BENZENESULFENYL CHLORIDE
George E. Serniuk, Roselle, N.J., assignor to Esso Research and Engineering Company, a corporation of Delaware
No Drawing. Filed July 22, 1958, Ser. No. 750,095
4 Claims. (Cl. 260—516)

This application relates to an improved process for preparing nitrocarboxybenzenesulfenyl halides.

In particular, it relates to a process for obtaining 2-nitro-4-carboxybenzenesulfenyl halide by halogenating 2-nitro-4-carboxyphenyl methyl sulfide.

More particularly, it releates to a process for obtaining a high yield of high purity 2-nitro-4-carboxybenzenesulfenyl chloride by an iodine catalyzed chlorination of 2-nitro-4-carboxyphenyl methyl sulfide.

The desired product, 2-nitro-4-carboxybenzenesulfenyl chloride, has found use in stereochemical research and as a reagent in the production of a modified butyl rubber possessing many valuable properties. This use is explained in detail in patent application U.S. Serial 706,206, filed December 30, 1957, now U.S. 2,952,291 which is a continuation-in-part of U.S. Serial 597,989, filed July 16, 1956, now abandoned.

Heretofore, 2-nitro-4-carboxybenzenesulfenyl chloride has been prepared by the chlorinolysis of bis (2-nitro-4-carboxyphenyl) disulfide. This process is described in detail in Volume 77, "Journal American Chemical Society," at pages 1150–1152. One disadvantage of using this process is that relatively poor yields are obtained in the production of the bis (2-nitro-4-carboxyphenyl) disulfide. This compound is prepared by condensing 3-nitro-4-chlorobenzoic acid with sodium disulfide; under the most carefully controlled conditions, yields that exceed 50% can seldom be obtained. This greatly increases the cost of producing the intermediate bis (2-nitro-4-carboxyphenyl) disulfide and, in turn, increases the cost of the desired product, 2-nitro-4-carboxybenzenesulfenyl chloride. Another disadvantage of this process is the loss in yield incurred in separating 2-nitro-4-carboxybenzenesulfenyl chloride from the reaction mixture due to the sludge-like formations resulting from the use of fuming sulfuric acid as the catalyst, and the incompleteness of the chlorinolysis reaction on a one cycle basis. The process of this invention may be demonstrated by the chlorination of 2-nitro-4-carboxyphenyl methyl sulfide.

In the chlorination reaction dry chlorine is added while the sulfide is suspended in an anhydrous halogenated solvent. Solvents that may be used for this process include ethylene dichloride (1,2-dichloroethane) chloroform, carbon tetrachloride, tetrachloroethane, chlorobenzene and dichlorobenzene. Of these, ethylene dichloride is preferred. If the process is used to produce the corresponding sulfenyl bromide, the corresponding brominated solvents could be used.

This process can be carried out without employing an additional substance for catalytic effect but the reaction proceeds very slowly. Catalysts that may be used to obtain this reaction include: $H_2SO_4$, $H_2SO_4 \cdot SO_3$ (5–60% $SO_3$). However, as previously pointed out, catalysts of this type present a product recovery problem. Suitable catalysts for the process of this invention include $SnCl_4$, $FeCl_3$, $TiCl_4$, $AlCl_3$, $ZnCl_2$, pyridine periodide, ICl, IBr, $I_2$, etc. Of these the iodine-containing catalysts are preferred and of these $I_2$ is most preferred. When iodine is employed as the catalyst, the 2-nitro-4-carboxybenzenesulfenyl chloride is easily separated from the reaction mixture without any noticeable product loss.

The expected product of this reaction should give a mere substitution of the chlorine atoms for the hydrogen atoms of the methyl group resulting in 2-nitro-4-carboxyphenyl trichloro methyl sulfide rather than a splitting off of the entire methyl group, as here, to form the sulfenyl chloride. Th. Zincke and A. Dahm Berichte 45[3], 3457 (1912), pages 3458, 3462–3, 3470 and 3475. This publication discloses the cleavage of longer alkyl and substituted alkyl groups from non-substituted phenyl alkyl thio ethers but when the process therein employed was carried out with a non-substituted phenyl methyl thio ether the result was chlorination of the methyl group.

In the instant process intermediates such as 2-nitro-4-carboxyphenyl alkyl or substituted alkyls containing 2 or more carbon atoms, aryl or substituted aryl, or alkyl-aryl sulfide derivatives can be used to produce the 2-nitro-4-carboxybenzene sulfenyl chloride but the use of 2-nitro-4-carboxyphenyl methyl sulfide is preferred for the following reasons, namely (1) the alpha hydrogens in such derivatives become halogenated during the chlorinolysis step and at least 3 molecular proportions of halogen are required to generate the sulfenyl halide as contrasted with 1 molecular proportion for the corresponding methyl sulfide derivative, (2) the halogenated fragments formed on chlorinolysis of the sulfide present a purification problem when the higher molecular weight groups are involved, and (3) the higher molecular weight alkyl, benzyl and aryl mercaptans required to form the desired sulfide intermediates are obtained at costs which render commercial production by this route uneconomical.

The following examples will illustrate the process in greater detail. These examples are illustrative only and should not be construed as limiting the scope of the invention. Example I recites the process for producing 2-nitro-4-carboxyphenyl methyl sulfide, the preferred intermediate for producing the desired product of this invention. Example II relates to the conversion of this intermediate to the desired 2-nitro-4-carboxybenzenesulfenyl chloride.

EXAMPLE I

*Preparation of 2-Nitro-4-Carboxyphenyl Methyl Sulfide*

To 50.5 g. (0.25 mole) of 3-nitro-4-chlorobenzoic acid, contained in a 2 liter, 4 way reaction flask, fitted with a mechanical stirrer, reflux condenser, thermometer, drop funnel and a mantle heater, were added 500 ml. of absolute methyl alcohol and 10 g. of sodium hydroxide. The solution was heated to reflux and a total of 12 g. (0.25 mole) of methyl mercaptan dissolved in 150 ml. of methyl alcohol containing 10 g. of sodium hydroxide was added drop by drop.

After all of the sodium mercaptide was added, the reaction mixture was stirred and refluxed for 6 hours. The reaction mixture was cooled in ice water and 100 ml. of concentrated hydrochloric acid were added gradually.

The yellow colored, crystalline product was filtered and thoroughly washed with water and then dried. The product, without further purification, showed a melting point of 243.5° C. The yield was 90 percent.

EXAMPLE II

*Conversion of 2-Nitro-4-Carboxyphenyl Methyl Sulfide to the Corresponding Sulfenyl Chloride*

A total of 5 g. of dry 2-nitro-4-carboxyphenyl methyl sulfide suspended in 125 ml. of boiling anhydrous ethylene dichloride was treated with chlorine (dried over $H_2SO_4$) in the presence of iodine as a catalyst. In 6 minutes the suspended 2-nitro-4-carboxyphenyl methyl sulfide dissolved and the reaction mixture became perfectly clear. Chlorine addition was discontinued and the solution allowed to cool. Upon cooling, brilliant yellow colored crystals precipitated which, when filtered and freed of solvent, amounted to 4.9 g. which is equivalent to 90% conversion. This product showed a melting point of 187° C. (literature=185° C.). The elemental analysis was as follows:

| Component | Calculated, Percent | Found, Percent |
|---|---|---|
| Cl | 15.2 | 15.4 |
| S | 13.7 | 13.48 |
| N | 6.0 | 5.45 |

What is claimed is:

1. A process for preparing 2-nitro-4-carboxybenzenesulfenyl chloride which comprises reacting 2-nitro-4-carboxyphenyl methyl sulfide with chlorine in an anhydrous inert chlorinated solvent in the presence of iodine as a catalyst.

2. A process for preparing 2-nitro-4-carboxybenzenesulfenyl bromide which comprises reacting 2-nitro-4-carboxyphenyl methyl sulfide with bromine in an anhydrous inert brominated solvent in the presence of iodine as a catalyst.

3. A process for preparing 2-nitro-4-carboxybenzenesulfenyl chloride which comprises reacting 2-nitro-4-carboxyphenyl methyl sulfide with chlorine in ethylene dichloride in the presence of iodine as a catalyst.

4. A process in accordance with claim 3 wherein the ethylene dichloride is boiling ethylene dichloride.

References Cited in the file of this patent

Kharasch et al.: Chem. Reviews, vol. 39, pages 283–288 (1946). (Copy in 260–543.)

Zincke et al.: Liebig's Annalen Bande 406, pages 127–137 (1914). (Copy in Library.)